United States Patent
Levine (10) Patent No.: US 7,733,213 B2
(45) Date of Patent: Jun. 8, 2010

(54) METHODS, SYSTEMS, AND COMPUTER PROGRAM PRODUCTS FOR PROVIDING TIME-LIMITED CALENDAR BASED PASSCODE ACCESS TO AREAS, BUILDINGS AND/OR ROOMS

(75) Inventor: David Levine, Smyrna, GA (US)

(73) Assignee: AT&T Intellectual Property I, L.P., Reno, NV (US)

(*) Notice: Subject to any disclaimer, the term of this patent is extended or adjusted under 35 U.S.C. 154(b) by 1048 days.

(21) Appl. No.: 11/420,539

(22) Filed: May 26, 2006

(65) Prior Publication Data

US 2007/0273474 A1 Nov. 29, 2007

(51) Int. Cl.
G06K 19/00 (2006.01)
(52) U.S. Cl. ............... 340/5.28; 340/825.69; 340/5.64; 340/5.65; 340/5.5; 379/102.06; 379/102.01
(58) Field of Classification Search ............ 340/825.69, 340/825.72, 5.28, 5.64, 5.65, 5.5; 379/102.06, 379/102.01
See application file for complete search history.

(56) References Cited

U.S. PATENT DOCUMENTS 5,705,991 A * 1/1998 Kniffin et al. .............. 340/5.28
6,728,351 B2 * 4/2004 Ahlstrom et al. ....... 379/102.06
2003/0125023 A1 * 7/2003 Fishler ...................... 455/426

\* cited by examiner

*Primary Examiner*—Vernal U Brown
(74) *Attorney, Agent, or Firm*—Myers Bigel Sibley & Sajovec, P.A.

(57) ABSTRACT

Methods, systems and computer program products provide time-restricted passcode access to a restricted access area by: (a) electronically generating a time-limited visitor access passcode that is operational for a security system for a limited time duration; then (b) electronically accepting the visitor access passcode in a security entry control access device in communication with the security system to allow a user with the visitor access passcode a time-limited entry to a restricted area; then (c) automatically electronically preventing user access to the restricted area using the visitor access passcode with the security entry control access device after a certain time or expiration of a certain time period. Embodiments of the invention may be particularly useful for allowing visiting meeting participants physical access to a restricted area in a building to attend a scheduled meeting.

20 Claims, 7 Drawing Sheets

METHODS, SYSTEMS, AND COMPUTER PROGRAM PRODUCTS FOR PROVIDING TIME-LIMITED CALENDAR BASED PASSCODE ACCESS TO AREAS, BUILDINGS AND/OR ROOMS

FIELD OF THE INVENTION

The present invention relates to providing access to restricted areas or buildings.

BACKGROUND OF THE INVENTION

Physical access to certain buildings may be restricted. If a visitor, whether vendor, contractor or employee, wants to gain entry to the building, to, for example, attend a meeting or service a piece of equipment, the visitor typically pages or telephones someone in the building to open the door for them. Unfortunately, such an action can be cumbersome, inefficient and time-consuming.

SUMMARY OF THE INVENTION

Embodiments of the invention are directed to systems and methods that can grant, generate and/or transmit limited time-restricted (time-limited or automatically expiring) passcodes for allowing access to restricted spaces, locked buildings, restricted rooms, corridors, floors or spaces of buildings.

Some embodiments of the present invention are directed to methods of providing time-restricted passcode access to a restricted access area. The methods include: (a) electronically generating a time-limited visitor access passcode that is operational for a limited time duration; then (b) electronically accepting the generated visitor access passcode in a security entry access control device to allow a user with the visitor access passcode a time-limited entry to a restricted area; then (c) automatically electronically preventing user access to the restricted area using the visitor access passcode with a security entry control access device after a certain time or expiration of a certain time period.

In particular embodiments, the method may include electronically inviting meeting participants to a meeting at a specified location at a specified time and date, electronically generating at least one meeting-specific access passcode associated with the meeting invitation, and transmitting the generated at least one meeting access passcode to meeting participants. The meeting access passcode can be the time-limited visitor access passcode.

Other embodiments are directed to systems for providing limited-time visitor access passcodes. The systems can include: (a) a computer network having at least one computer having a visitor requester portal for requesting visitor access to a restricted area; (b) a calendar-based access server in communication with the at least one computer, the calendar-based access server configured to generate a time-limited visitor passcode to allow visitor access to the restricted area; (c) a security server in communication with the calendar-based access server; and (d) at least one security passcode entry device in communication with the security server that controls access to at least one restricted access area.

Some embodiments are directed to computer program products for providing time-limited calendar-based access to restricted areas. The products include a computer readable storage medium having computer readable program code embodied therein. The computer readable program code includes: (a) computer readable program code configured to generate a time-limited access passcode that is operational for a security system for a limited time duration; (b) computer readable program code configured to accept the access passcode in a security entry control device in communication with the security system to allow a user with the access passcode a time-limited entry to a restricted area; and (c) computer readable program code configured to reject the access passcode to the restricted area using the security entry control device on a date after a certain time or expiration of a certain time period.

Although described primarily above with respect to method aspects of the present invention, it will be understood that the present invention may also be embodied as systems and computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of exemplary embodiments thereof when read in conjunction with the accompanying drawings, in which.

DETAILED DESCRIPTION OF EMBODIMENTS OF THE INVENTION

While the invention may be made in modified and alternative forms, specific embodiments thereof are shown by way of example in the drawings and will be described in detail. It should be understood, however, that there is no intent to limit the invention to the particular forms disclosed, but on the contrary, the invention is to cover all modifications, equivalents, and alternatives falling within the spirit and scope of the invention. Like reference numbers signify like elements throughout the description of the figures.

In the figures, the thickness of certain lines, layers, components, elements or features may be exaggerated for clarity. Broken lines illustrate optional features or operations unless specified otherwise. In the claims, the claimed methods are not limited to the order of any steps recited unless so stated thereat.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

The present invention may be embodied as systems, methods, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory.

The term "passcode" refers generally to any type of data or signal that can be used by a person to allow a person(s) to gain authorized access to a restricted building or area and is not limited to a password or personal identification number. The passcode can be configured to operate with any suitable security access control device on a door (passcode entry device) to selectively allow entry to a building (unlock or open a door). For example, the passcode can be transmitted or entered to a local keypad (keys or touch pad) entry device, or via an electronic reader such as a magnetic or optical reader or other digital or electronic signal reader, and the like. In some embodiments, the passcode may comprise a bar code, a multi-digit alphanumeric code, or magnetic signal. The passcode may also or alternatively comprise an audio signal that can be electronically transmitted by a user to gain entry, such an audio signal can be generated and transmitted to a pervasive computing device of authorized visitors, such as a mobile communications device (i.e., mobile phone), Blackberry or PDA. It is also contemplated that the passcode may include biometric data for a prospective visitor.

The term "visitor" refers to any personnel or persons, whether an employee, outside contractor, vendor, service provider, client or other person, desiring access to a restricted area. Typically a visitor is a person that does not have free or regular access to a restricted area. The term "area" means a property space including, for example, grounds, a road, a building, an interior portion of a building, such as, but not limited to, a floor, a corridor, a suite, and a room.

The passcode entry devices contemplated by embodiments of the instant invention can be configured to allow access using a plurality of different passcodes at any one time. One of which may be a standardized passcode for unrestricted "regular" personnel. The others of which may be for limited-time passcodes for visitors. In other embodiments, an area may comprise at least two access entry devices, one dedicated to regular personnel and the other to visitors. At least the visitor entry device may be in communication with a camera to monitor entry remotely.

Figure 1:
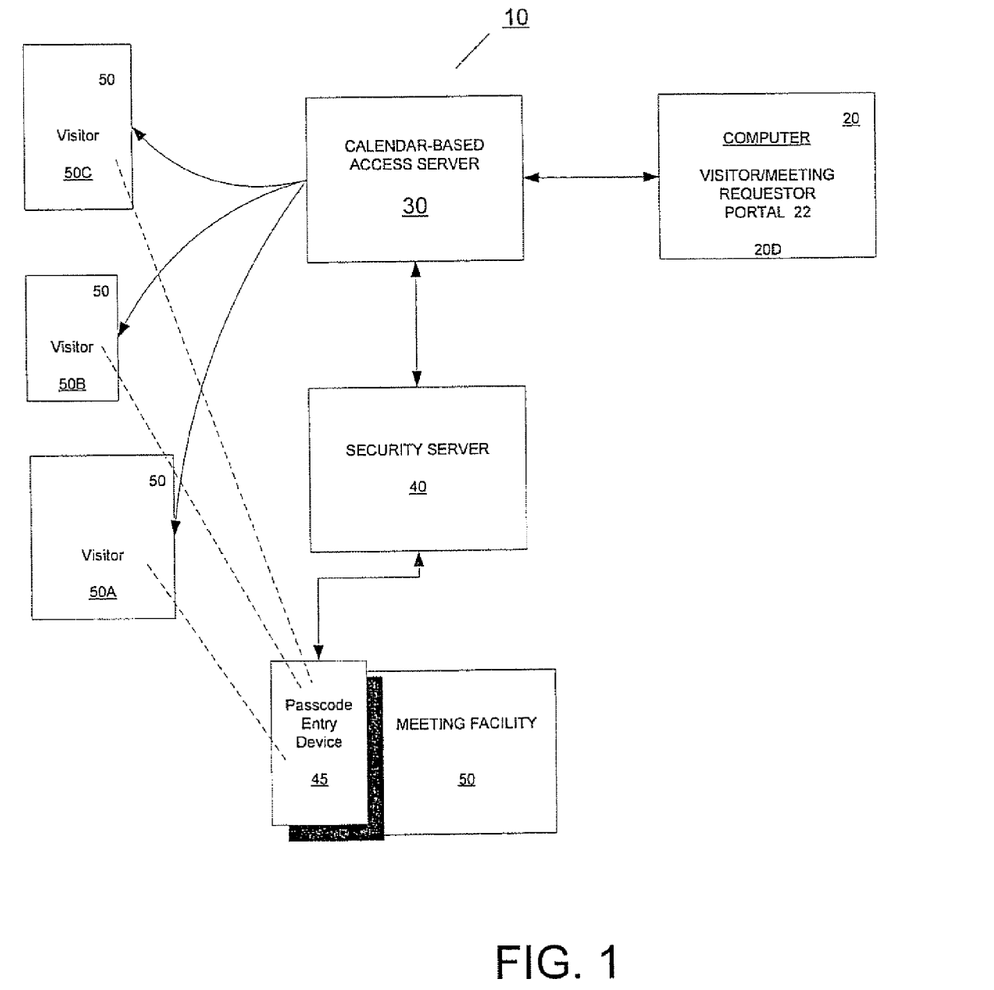
FIG. 1 is a block diagram that illustrates a communication network in accordance with some embodiments of the present invention.

FIG. 1 illustrates a system 10 that can be used to administer time-limited calendar based access to restricted areas. As shown, the system 10 can include at least one (typically a plurality) of computers 20 with a visitor requestor (such as a meeting requestor) portal 22. The portal 22 can allow a user to electronically request that one or more designated persons be granted access to a restricted area on a certain time and date for a certain reason. The request can be received by a calendar-based access server 30 that communicates with a security server 40. The security server 40 can communicate with one or more local security access passcode entry devices 45 for a restricted area 50, such as a building. The calendar-based access server 30 can be configured to electronically transmit passcodes to prospective visitors 50, such as a meeting participant (invitee). The passcode can be sent in various manners, such as automatically electronically with an electronic meeting invitation and/or upon acceptance of the meeting invitation, as will be discussed further below. The passcodes may optionally be unique for each invitee (individualized), which can allow a system to track the persons attending the meeting.

The calendar-based access server 30 can notify the security server 40 to direct the passcode entry device 45 to accept the defined passcode(s) to allow access using a designated temporary (time-limited) passcode on a certain day (and time). The calendar-based access server 30 can generate the passcodes and direct the security server 40 to accept the passcodes on a certain date and for certain time delimited periods. A default expiration time may set by the server 30 or a requestor may, in some embodiments, set the time, but expiration periods may automatically be defined so not to exceed a relatively short time period (less than 4 hours or less than 1 hour), unless an authorized administrator enters a passcode in the request that allows a longer time-limited access for security reasons. In some embodiments, the time-limited access can be defined based on a projected meeting or visit length as input by the requestor, or may expire within a certain time of requested time, such as 15 to 30 minutes after a requested entry access time. In particular embodiments, the passcode can expire before the meeting time period ends such as about 15 or 30 minutes before a scheduled meeting termination time.

It is noted that the functions of the calendar-based access server 30 and security server 40 can be carried out on one server or more than one server, partially on one and partially on others, locally or remotely or in other different configurations. The system 10 can include firewalls and other secure communication protocols (encryption) and devices (not shown). The system 10 can comprise a computer network such as an intranet and/or a wide area network such as or the Internet. Thus, although FIG. 1 illustrates an exemplary communication network, it will be understood that the present invention is not limited to such configurations, but is intended to encompass any configuration capable of carrying out the operations described herein.

It is also noted that a calendar-based server 30 and/or a security server 40 may not be required to provide the time-limited passcode entry. That is, as shown in FIG. 1, the passcode can be changed electronically on the local security access control entry devices 45 via a remote control wireless or hard-wired server or electronic system 40. Alternatively, the passcode for respective devices 45 can be manually changed daily, or at other intervals, such as prior to a meeting without requiring the use of a security server 40. The devices 45 can include a control circuit with clock that allows a time-limit to be established with the passcode (not shown). Alternatively, the devices 45 can be configured so that the passcode can automatically expire within a certain time of programming, such as within 24, 12, 8, 4, 2 or 1 hours after activating the passcode(s) for entry access.

The transmission of the passcodes can be to various visitor devices, such as a computer 50a, a mobile communication device such as a pager, mobile phone or a conventional phone 50b, or a pervasive computing device 50c such as a Blackberry, PDA or other device. The transmission can be carried out based on a web page communication system or via IVR (Interactive Voice Control System). The transmission of the passcode can be automated and/or sent via email, instant message, pop-up reminder, automated electronic calendar entry scheduling software (such as via MICROSOFT OUTLOOK), as well as telephone voice or text messaging or at a secure webpage or IVR response. The passcode can also be mailed or physically shipped to an authorized visitor.

The passcode can be changed "on-the-fly" at different time intervals during a visit and this information electronically relayed to the visitor. This may be particularly suitable for visitors accessing the facility over more than several hours or more than one day.

The system 10 can be configured to accept multiple passcodes during different periods of time, some of which may have longer authorization periods than others. In other embodiments, the passcode(s) can change at irregular intervals during a time period for first time entry or subsequent reentry to inhibit access of unauthorized persons during overlapping or different periods.

The passcode can be individualized per request for access, such as per meeting, per service request, per visitor and the like. The passcode can be configured to allow multiple persons to enter using the same time-limited passcode at a particular day and time period. The passcode can be generated to be unique for visitors having a common purpose, such as invitees to a particular scheduled meeting. It is also contemplated that the passcode may be individualized so that each visitor receives a unique passcode, even for a common meeting or event. In this visitor-specific passcode, the system 10 can be configured to alert a sponsor or meeting requestor when all participants have arrived, and/or notify of each arrival onsite based on the use of the access code. Similarly, as the meeting time approaches, the system 10 can be configured to notify the planner as to those invitees not yet onsite. This may be particularly useful in large facilities where access is restricted at locations relatively far from the meeting venue.

In some embodiments, the visitor is not given an access passcode until they affirmatively respond to confirm they will attend the meeting or other scheduled event. The invitation and response can be electronically carried out. In some embodiments, a visitor can pre-select or define his/her own passcode that the system 10 will accept but that is activated for on a time-limited date specific period. Thus, for example, a meeting participant can select his/her own passcode, which can be registered in the server 30 and/or security server 40 and activated to allow access for a specified date and time.

The passcode may be configured for a limited number of uses to enter a location. The security server 40 and/or device 45 can include a counter that counts the number of times an access passcode is used. If the number of entries exceeds a threshold number, such as more than a projected number of attendees at a meeting, the access code can be disabled.

Figure 2:
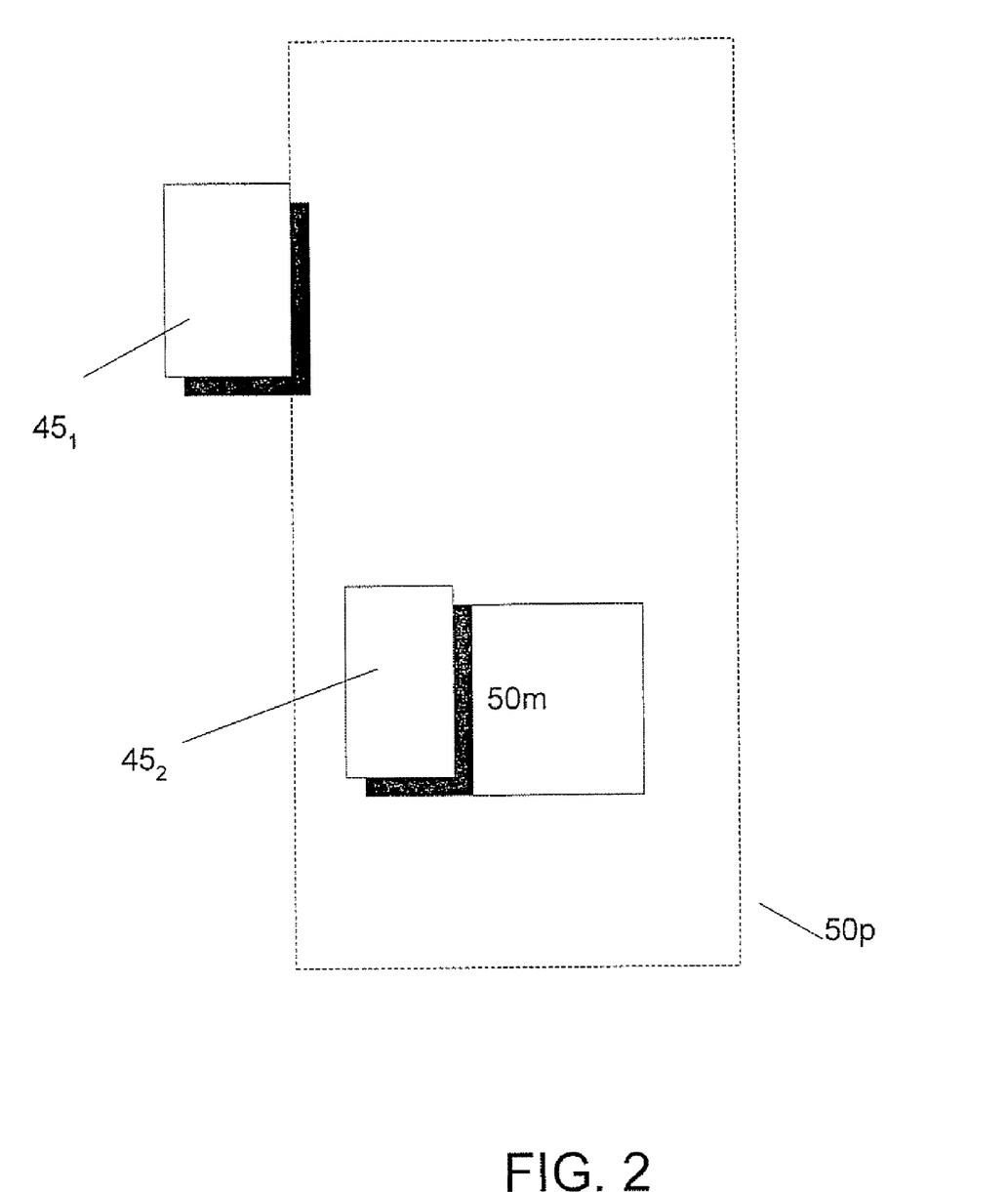
FIG. 2 is a block diagram illustrating a plurality of discrete security entry control devices within a restricted area, which may require one or more passcodes according to embodiments of the present invention.

In some embodiments, the system 10 can be configured to generate a plurality of different passcodes to a prospective visitor; each passcode may be time-limited for a different time access or for a different location. For example, as shown in FIG. 2, a meeting can be in a restricted access building 50p and a restricted access interior region such as a restricted access meeting room 50m. Thus, the system 10 can be configured to allow user entry at an exterior perimeter entry device $45_1$, and inside a building at the meeting room device $45_2$, using the same or different passcodes.

In some embodiments, the system 10 can allow a specific user or a group of users, a limited number of uses of the passcode. For example, as shown in FIG. 2, where a meeting is planned in a restricted access building 50b and a restricted access meeting room 50m, the system 10 can be configured to allow one user entry at an exterior perimeter entry device $45_1$, and twice (or more) inside a building at the meeting room device $45_2$.

Where only an interior portion of the building (floor, section or other portion) is restricted, the passcode may be active for one or a plurality of uses during the meeting time period. In the limited number of reuse embodiments, a user/visitor can leave the restricted meeting room (for such as a bathroom break) and still be allowed to re-enter the meeting room 50*m* or other interior restricted area after the initial entry using the passcode.

Where a group of visitors use the same passcode, the security system 10 can be configured to count the number of entries using the passcode and automatically disable entry when the count exceeds a certain threshold. For example, where a meeting invites 10 participants, if the number of persons using the entry passcode exceeds 10, access is denied.

The passcode can be electronically generated (typically upon request) and will typically include a random alphanumeric (which includes just alpha or just numeric) series of digits. The passcode may be at least 5 digits long to inhibit unauthorized "guessing" access. The passcode reading device can be configured to delay in accepting or authorizing serial passcode entry attempts or prohibit more than two or three consecutive attempts so that a person cannot easily enter passcodes/numbers randomly until a valid passcode is entered. The delay may be at least about two seconds.

The passcode can be configured to include a random series of digits that may be generated by a random number generator and/or may include codes on waiting for output in a passcode queue. The passcode may alternatively or additionally include standardized portions, such as one or more of: (a) a building identifier code, (b) a meeting code, and (c) a unique "user identifier" code. For example, the code format may be along the lines of: XXXYYYYZZZ.

Where X is the Building and/or floor identifier, (Main Building 13th floor, could be M13), Y is the meeting starting at 2 PM and ending at 4 PM on April 11 (2411), Z is a visitor-specific identifier number (A-Z, 001-100).

Alternatively, a common visitor code can be generated for specific time intervals. For example, Monday at 3 PM, the system can recognize one or more predefined passcode for visitors for a specified period. The passcodes may be generated and/or transmitted proximate the planned access, and transmitted to the user proximate to actual entry on a personal device of the visitor (meeting participant or service personnel), such as the day of the planned meeting.

Where visitor-specific identifier codes are used, the system 10 can be configured to monitor the number and locations of access to a building. The system 10 can be configured to alert of abnormal behavior, such as attempted entry to non-authorized locations or buildings.

Figure 3:
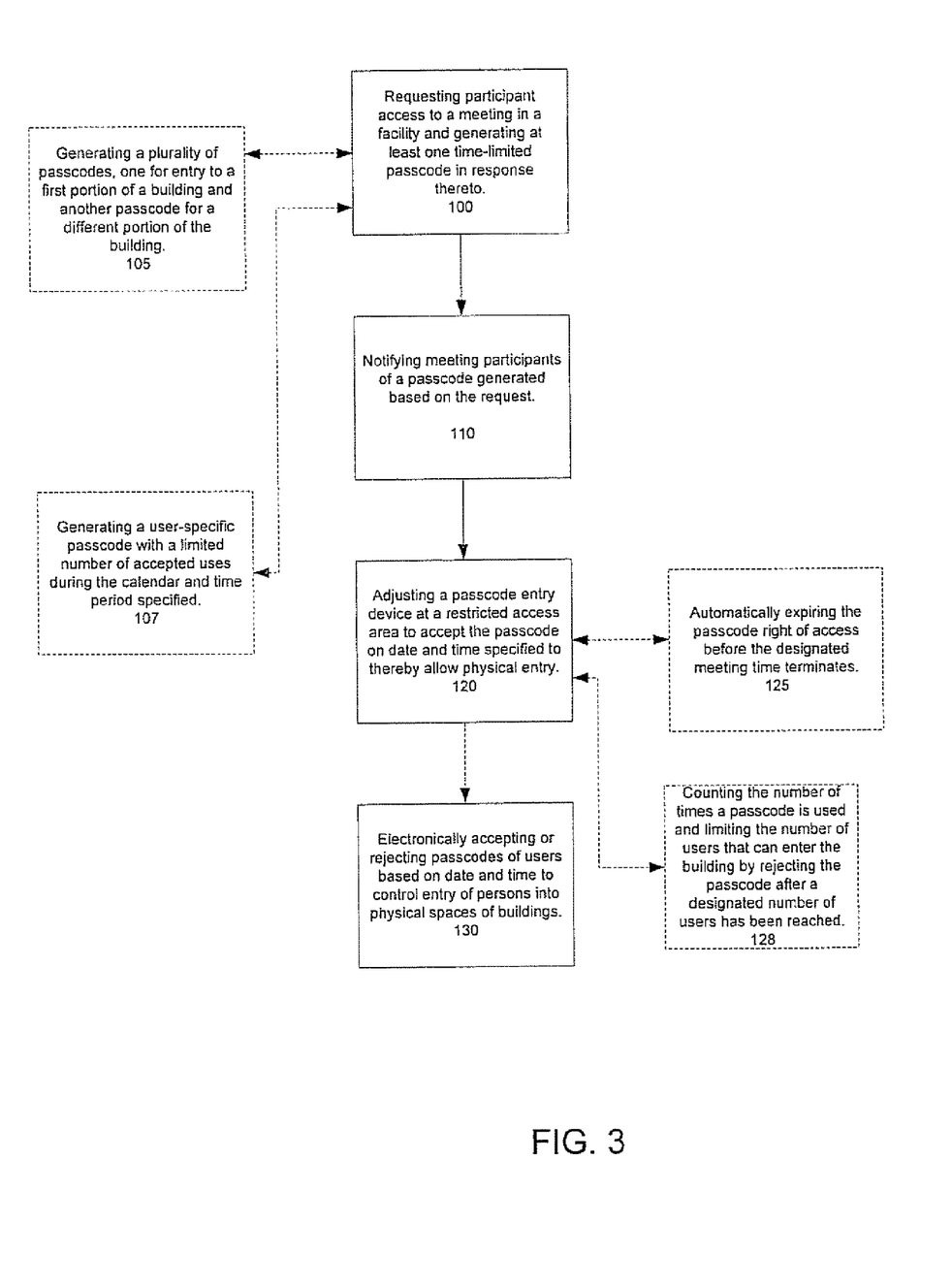
FIG. 3 is a flow chart of exemplary operations for generating at least one limited-time passcodes according to embodiments of the present invention.

FIG. 3 illustrates exemplary operations that can be carried out according to some embodiments of the present invention. In this example, a requestor wants to schedule a meeting in an area that has restricted entry protected by at least one electronic passcode entry device. Participant access to a meeting in a facility is requested and at least one time-limited passcode is generated (or pre-generated and assigned) in response thereto (block 100). Meeting participants are notified of the passcode and meeting date/time (block 110). At least one entry device of a restricted area is adjusted (typically automatically) to accept the passcode on the date (and time) specified to thereby allow physical entry (block 120). Electronically accepting or rejecting user passcodes based on date and time to control entry of persons into physical spaces of the area (such as building) (block 130).

Optionally, a plurality of different passcodes can be generated, one for entry into a first portion of a building, another for entry in a different portion of the building (block 105). Optionally, a user (visitor)-specific passcode can be generated and/or the passcode may have a limited number of accepted uses for entry during a calendar and time period specified (block 107).

Optionally, the passcode can expire to deny any right of access before the designated meeting time ends (block 125). Optionally, the number of times a passcode is used can be counted and the number of users allowed access using the passcode can be limited such that additional users can be denied access to an area after a threshold or designated number has been reached (block 128).

It is noted that in some embodiments, the passcode can be transmitted with a meeting notification using an electronic automated calendar scheduling software program including, but not limited to, MICROSOFT OUTLOOK. In other embodiments, the passcode is transmitted only after an invitee has electronically confirmed attendance at the planned meeting. The passcode may be transmitted automatically electronically in response to the confirmation at that time, or delayed and transmitted shortly before the meeting date (such as the day before). An invitee can select the passcode transmission procedure/device preferred, such as email, phone, etc.

In some embodiments, visitors may include employees of a company housed in different buildings or segments according to business units. Thus, the requester can set-up meetings with co-employees using, for example, the intranet and an automated software calendar scheduler which can append a time-limited passcode automatically with the meeting invite or send later in response to confirmation of receipt and acknowledgement of the meeting, efficiently providing time-limited access to different areas of a facility that may be needed based on meeting locale.

Figure 4A:
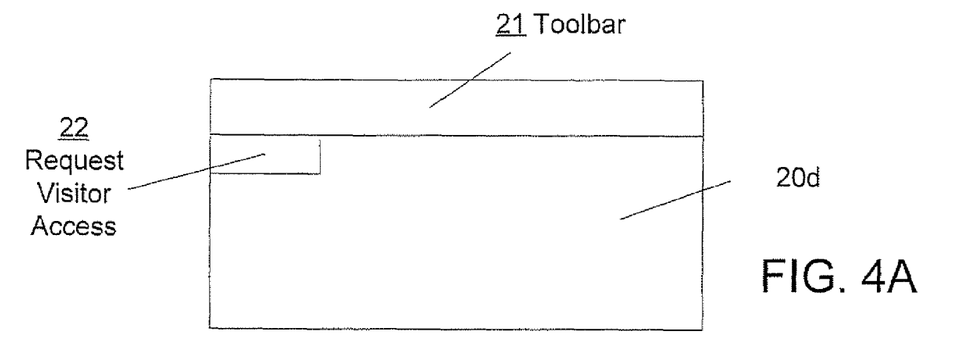
FIGS. 4A-4C are schematic illustrations of passcode request and response data according to embodiments of the invention.
Figure 4B:
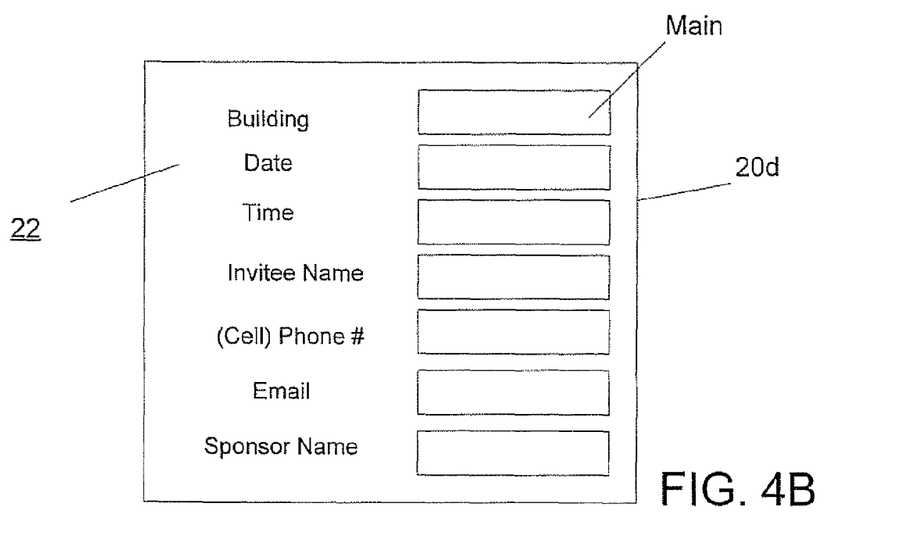
Figure 4C:
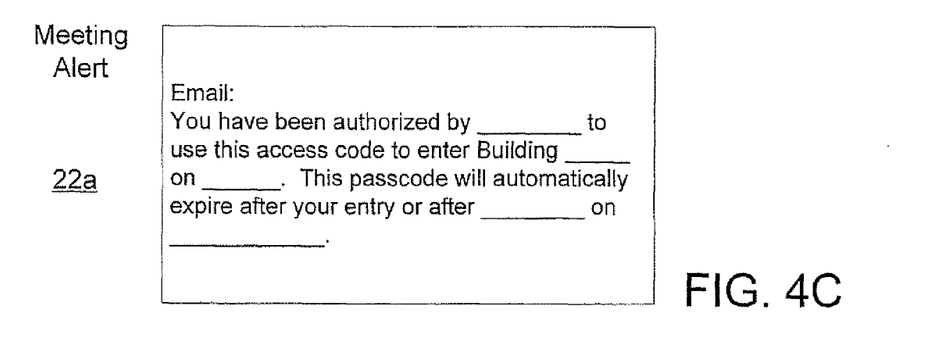

FIGS. 4A-4C illustrate exemplary electronic protocols that can be used to generate the passcodes. FIG. 4A illustrates a computer workstation 20 with a display 20*d* and the requestor portal 22. The requester portal 22 can be a menu selectable item on the toolbar as shown or may be an icon on a desktop or other suitable configuration. As shown in FIG. 4B, a requester can use the portal 22 to enter meeting information, such as date, time and place and names of at least one invitee. The system 10 can be configured to transmit a meeting alert 22*a* such as shown in FIG. 4C that notifies meeting participant of a passcode. Although shown as an email, other transmission configurations can be used as discussed above. As shown, the email can include the passcode information, location entry authorized and that the passcode is time-limited. It may be appropriate to omit the time-limit information in some embodiments, but a warning that the passcode is time-limited may be appropriate. It is noted that the requestor portal 22 may be on one, selected or all computers in a network. For example, the portal 22 can reside only on an administrator's computer or on a workstation in each department or business unit, or on substantially all or all of the workstations in a facility, business, business unit or department.

Although particularly suited for large facilities, embodiments of the invention can be used to provide and/or administer time-limited passcode access to other restricted access areas, such as residences or commercial buildings. That is, it is conventional to use lock boxes on residences for sale to allow realtors to show homes when the owner is not present. Embodiments of the present invention can provide a limited-time duration passcode (date and typically time specific) to requesting realtors, rather than providing a static digital or physical key.

Figure 5A:
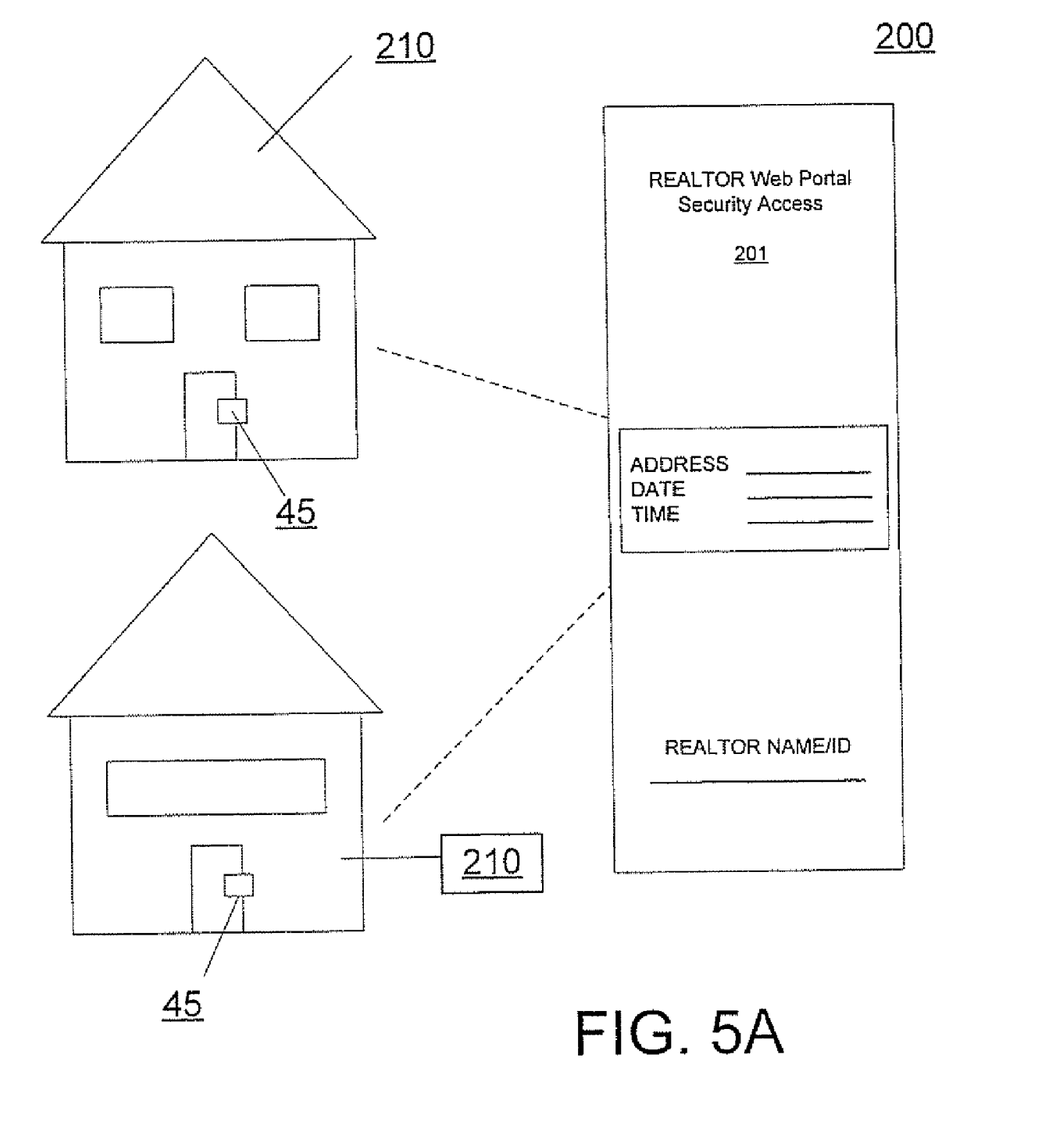
FIG. 5A is a schematic illustration of a realtor based limited time passcode access system according to some embodiments of the invention.

As shown in FIG. 5A, the realtor system 200 can be provided according to same embodiments of the present invention. The system 200 may comprise a portal 201 on a secure web based system. Alternatively, or additionally, the system 200 can operate by using an IVR system that allows an authorized user to obtain a time-limited passcode from an automated system. Using a web-based system, the realtor system 200 can allow a realtor to electronically request access for an address of a residence 210 or commercial real estate listing on a date and time. The request may require certain certifications or realtor identification before a passcode for a residence is released.

The passcode can be manually entered on the access control device 45 at the residence or commercial building by the owner or representative of the owner (such as a homeowner) or wirelessly entered via the direction of the system 200. For example, in the former situation, the homeowner or representative could receive an electronic email for access, and a time-limited passcode can be transmitted to the requesting realtor noting the date and time limitations. In either the local or remote control of the active passcode(s) during a particular time period, the device 45 can be configured (via manual and/or electronic remote control) to accept the passcode on the date specified for a limited period of time, such as for one hour. A plurality of devices 45 can be electronically networked to the system 200. In some embodiments, the passcode can change periodically automatically, such as daily or may change upon providing a user with a passcode.

Figure 5B:
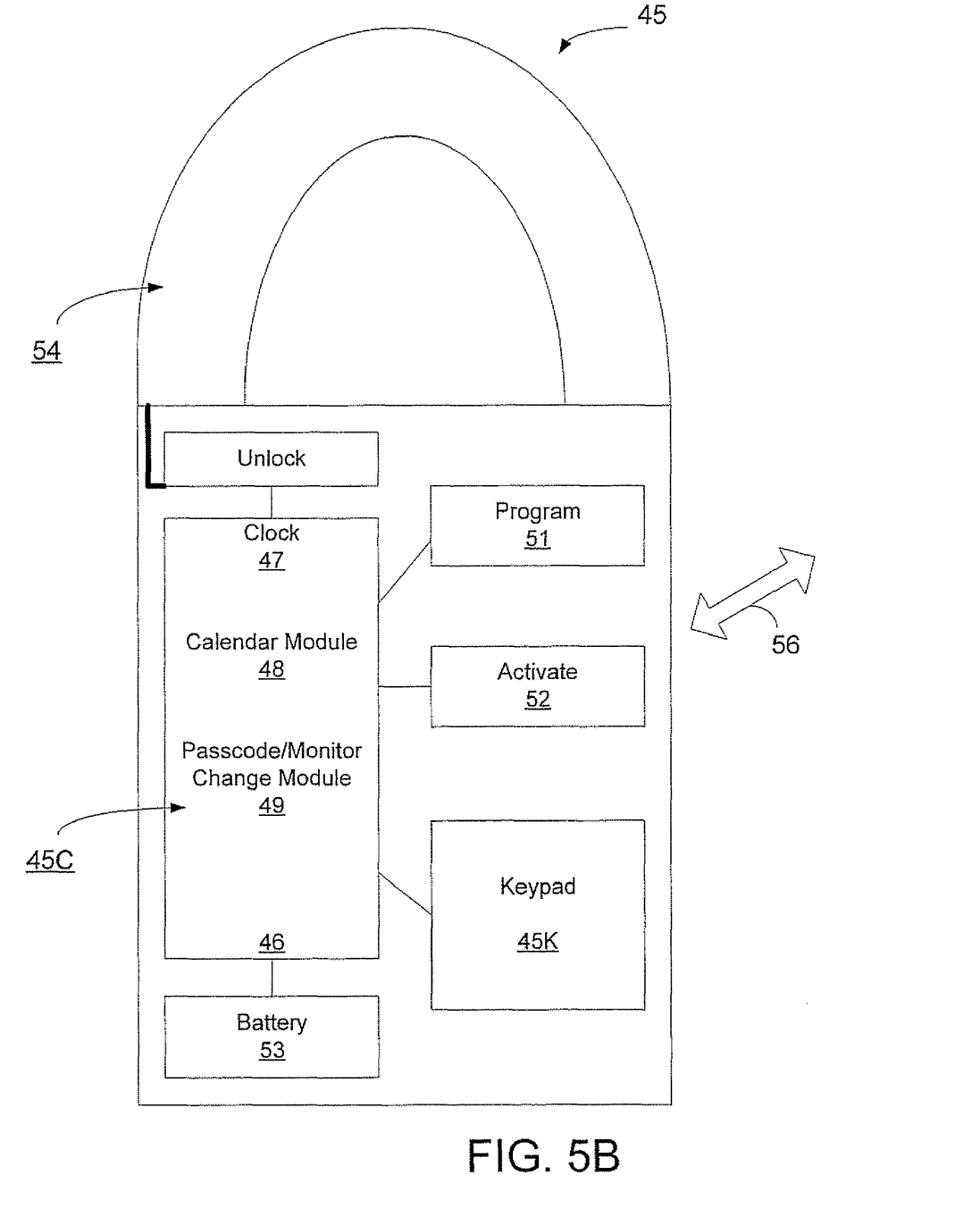
FIG. 5B is a schematic illustration of a programmable security access control device that can recognize different passcodes for different time periods according to some embodiments of the present invention.

In some embodiments, the local device 45 can recognize different passcodes during a period of time, and each may expire at the same time or at different times. As shown in FIG. 5B, the device 45 can include a circuit 45c with a digital signal processor 46 that includes a clock 47, a calendar module 48, and a passcode change/monitor module 49. The circuit 45c also includes a battery 53, a keypad 45k. The device 45 is configured to have a program mode 51 and an "activate" or "operate" mode 52. The circuit 45c can direct a lock 54 to disengage if the passcode is appropriate for that date and time. The modes can be wirelessly selected and/or manually selected. The device 45 can store a plurality of different passcodes that are active for different time periods and/or on different days. The passcodes can change over time. For example, if a realtor and client notice a house that they would like to see, a mere telephone call or access to a web page can provide an access code that can be used locally in less than about 5-10 minutes, allowing a realtor to show a home without scheduling an appointment in advance. This embodiment may also be helpful in situations where a realtor forgets a conventional key or keypad (or the keypad is not working).

Optionally, the device 45 can wirelessly communicate (as indicated by the double arrow lines 56) with a remote control system to update the passcodes accepted or denied by the device 45, and may operate to do so in substantially real-time.

In some embodiments, a realtor can use a universal keypad or "key" that can be used to communicate the time-limited passcode to engage the local security access control device 45 to unlock the door using the entry device 45 and thereby allow entry for a certain limited period of time. In other embodiments, the local device 45 has the keypad and is preprogrammed with the passcode and the realtor arrives with the time-limited passcode.

For example, if someone wants to visit a house, a real estate agent can go to a web page and enter his/her personal information. The web page can be configured to grant a unique passcode that can be used only for the specified time range. Using this process, a selling agent can know who requests access to visit the house, and whether the specific buying realtor visited the house because of the specific passcode.

It is noted that instead of the web page configuration or as an alternative thereto, the passcode can be transmitted to a requesting realtor using an IVR system. The transmission of the passcode can occur in substantially "real-time" using the IVR and/or a wireless device. The passcode can be generated sua sponte upon request of access and/or may be configured to automatically change at certain intervals. In any event the transmission can be wirelessly carried out via email, text messaging, radiotelephone, using an automated IVR system and the like, in response to a request therefore.

Figure 6:
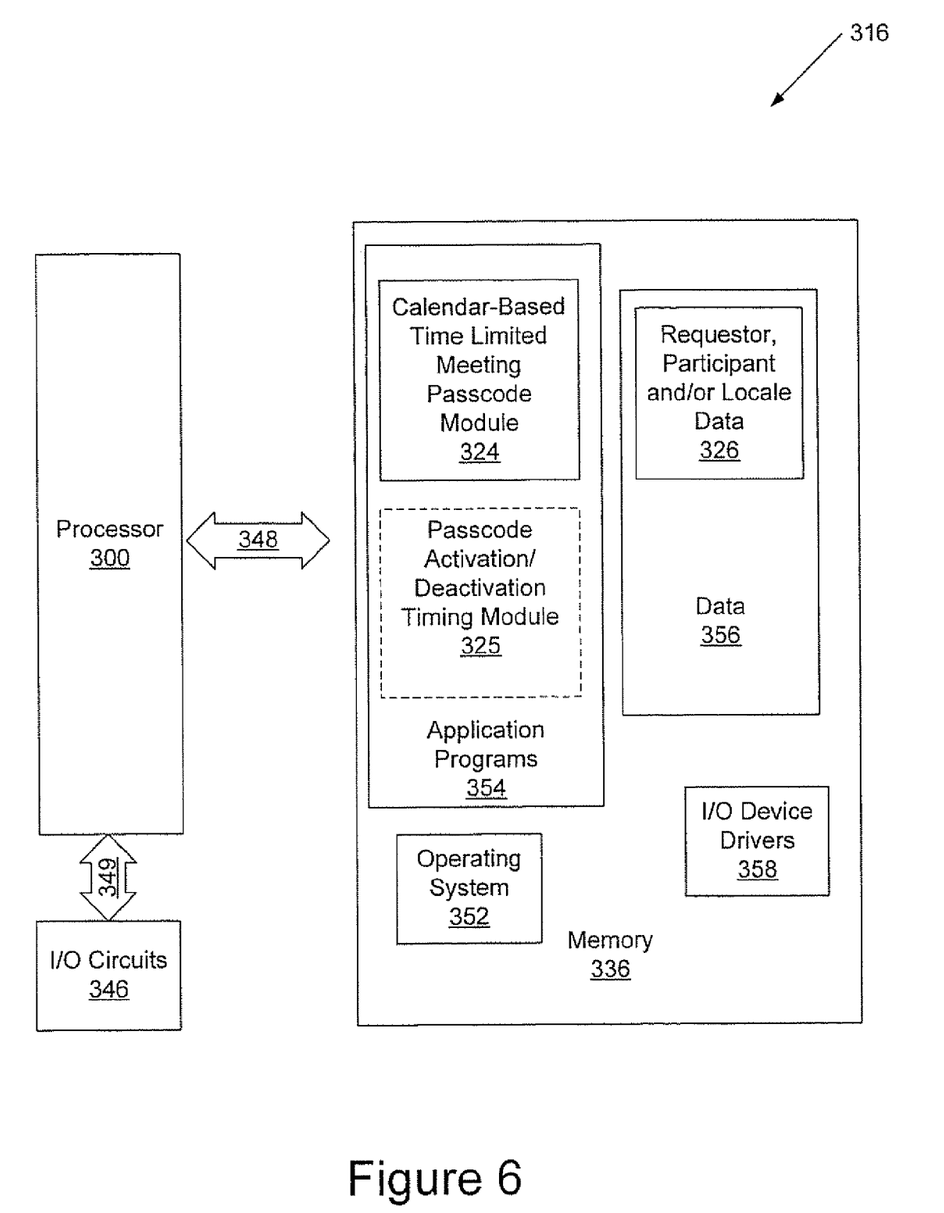
FIG. 6 illustrates a data processing system that may be used to facilitate the limited time passcodes in accordance with some embodiments of the present invention.

Referring now to FIG. 6, a data processing system 316 that may be used to implement the calendar-based time limited passcode system of described herein and/or shown in the figures, in accordance with some embodiments of the present invention, comprises input device(s) 20 (FIG. 1) which can include a keyboard or keypad, a display 20d (FIG. 1), and a memory 336 that communicate with a processor 300. The data processing system 316 may further include an input/output (I/O) circuits and/or data port(s) 346 that also communicate with the processor 300. The system 316 may include removable and/or fixed media, such as floppy disks, ZIP drives, hard disks, or the like, as well as virtual storage, such as a RAMDISK. The I/O data port(s) 346 may be used to transfer information between the data processing system 316 and another computer system or a network (e.g., the Internet). These components may be conventional components, such as those used in many conventional computing devices, and their functionality, with respect to conventional operations, is generally known to those skilled in the art.

FIG. 6 illustrates the processor 300 and memory 336 that may be used in embodiments of calendar based time-limited passcode systems in accordance with some embodiments of the present invention. The processor 300 communicates with the memory 336 via an address/data bus 348. The processor 300 may be, for example, a commercially available or custom microprocessor. The memory 336 is representative of the one or more memory devices containing the software and data used for providing a calendar based time limited passcode system with interface on a display in accordance with some embodiments of the present invention. The memory 336 may include, but is not limited to, the following types of devices: cache, ROM, PROM, EPROM, EEPROM, flash, SRAM, and DRAM.

As shown in FIG. 6, the memory 336 may contain up to two or more categories of software and/or data: an operating system 352, I/O Device Drivers 358. data 356 such as Requestor/Participant and/or access site data 326, and application programs 354.

As will be appreciated by those of skill in the art, the operating system 352 may be any operating system suitable for use with a data processing system, such as IBM®, OS/2®, AIX® or zOS® operating systems or Microsoft® Windows®95, Windows98, Windows2000 or WindowsXP operating systems Unix or Linux™. IBM, OS/2, AIX and zOS are trademarks of International Business Machines Corporation in the United States, other countries, or both while Linux is a trademark of Linus Torvalds in the United States, other countries, or both. Microsoft and Windows are trademarks of Microsoft Corporation in the United States, other countries, or both. The input/output device drivers 358 typically include software routines accessed through the operating system 352 by the application programs 354 to communicate with devices such as the input/output circuits 346 and certain memory 336 components. The application programs 354 are illustrative of the programs that implement the various features of the circuits and modules according to some embodiments of the present invention. Finally, the data 356 represents the static and dynamic data used by the application programs 354 the operating system 352 the input/output device drivers 358 and other software programs that may reside in the memory 336.

As further illustrated in FIG. 6, according to some embodiments of the present invention, application programs 354 may optionally include a passcode activation/deactivation timing log for each access device in a restricted area. The application program 354 may be located in a local server (or processor) and/or database or a remote server (or processor) and/or database, or combinations of local and remote databases and/or servers.

While the present invention is illustrated with reference to the application programs 354, 324, 325 in FIG. 6, as will be appreciated by those of skill in the art, other configurations fall within the scope of the present invention. For example, rather than being application programs 354 these circuits and modules may also be incorporated into the operating system 352 or other such logical division of the data processing system. Furthermore, while the application program 354 is illustrated in a single data processing system, as will be appreciated by those of skill in the art, such functionality may be distributed across one or more data processing systems in, for example, the type of client/server arrangement described above. Thus, the present invention should not be construed as limited to the configurations illustrated in FIG. 6 but may be provided by other arrangements and/or divisions of functions between data processing systems. For example, although FIG. 6 is illustrated as having various circuits and modules, one or more of these circuits or modules may be combined or separated without departing from the scope of the present invention.

Although FIG. 6 illustrates exemplary hardware/software architectures that may be used in passcode systems such as shown in FIGS. 1-5, it will be understood that the present invention is not limited to such a configuration but is intended to encompass any configuration capable of carrying out operations described herein. Moreover, the functionality of the data processing systems and the hardware/software architectures may be implemented as a single processor system, a multi-processor system, or even a network of stand-alone computer systems, in accordance with various embodiments of the present invention.

Computer program code for carrying out operations of data processing systems discussed above with respect to the figures may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described herein with reference to flowchart and/or block diagram illustrations of methods, systems, and computer program products in accordance with exemplary embodiments of the invention. These flowchart and/or block diagrams further illustrate exemplary operations for administering and/or providing calendar-based time limited passcodes, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

The flowcharts and block diagrams of FIGS. 1-6 illustrate the architecture, functionality, and operations of some embodiments of methods, systems, and computer program products for providing and/or administering calendar based time-limited passcodes. In this regard, each block represents a module, segment, or portion of code, which comprises one or more executable instructions for implementing the specified logical function(s). It should also be noted that in other implementations, the function(s) noted in the blocks might occur out of the order noted. For example, two blocks shown in succession may, in fact, be executed substantially concurrently or the blocks may sometimes be executed in the reverse order, depending on the functionality involved. Some embodiments of the present invention have been illustrated herein by way of example. Many variations and modifications can be made to the embodiments without substantially departing from the principles of the present invention. All such variations and modifications are intended to be included herein within the scope of the present invention, as set forth in the following claims.

That which is claimed:

1. A method of providing time-restricted passcode access to a restricted access area, comprising:

electronically inviting meeting participants to a meeting at a specified location at a specified time and date;

electronically generating at least one access passcode for invited meeting participants that is operational for a limited time duration associated with the meeting time and date in response to the electronically inviting step; then electronically accepting the generated access passcode in a security entry access control device to allow a user with the access passcode a time-limited entry to a restricted area associated with the specified meeting location; then automatically electronically preventing user access to the restricted area using the generated access passcode with a security entry control access device after a certain time or expiration of a certain time period.

2. A method according to claim 1, wherein the generating step is configured to generate at least one meeting-specific access passcode, the method further comprising transmitting the generated at least one meeting-specific access passcode to the invited meeting participants.

3. A method according to claim 1, wherein the at least one access passcode is generated as a plurality of unique passcodes for a respective meeting, one for each invited meeting participant.

4. A method according to claim 1, wherein the at least one access passcode is generated on a group participant basis as a meeting-specific passcode.

5. A method according to claim 1, further comprising receiving a request for visitor access to a restricted area on a specified date and time associated with the meeting from a user over a computer network to cause the generating step, and wherein the accepting and preventing steps are carried out automatically using a server system that electronically automatically alters acceptable entry passcodes on the at least one security access device at the appropriate times and dates.

6. A method according to claim 1, further comprising electronically transmitting at least one time-restricted visitor access code with a meeting invitation associated with the electronically inviting step to an invited meeting participant after the generating step using a computer network.

7. A method according to claim 1, further comprising providing a requestor portal in communication with a computer network, wherein the inviting step comprises allowing a user to request a time-limited access code for a meeting participant using the requestor portal, then electronically accepting input of identifying data for the meeting participant, and wherein the method further comprises electronically transmitting the electronically generated time-limited access code to a prospective invited meeting participant over the computer network.

8. A method according to claim 1, further comprising electronically transmitting the at least one access passcode to an invited meeting participant using at least one of electronic mail or text message.

9. A method according to claim 1, further comprising automatically electronically counting numbers of users accessing the restricted area using the at least one time-limited access passcode associated with the invited meeting participants and electronically terminating acceptance of the passcode when the counted number exceeds a certain value.

10. A method according to claim 1, further comprising electronically allowing a limited number of entries to the restricted area per a generated passcode that is user-specific during a period of time, and wherein the passcode is configured to expire before a planned end time of the meeting.

11. A method according to claim 1, wherein the time-limited duration is defined by a scheduled meeting end time, and wherein the preventing user access step is configured to electronically disallow entry using the generated passcode with the security entry access device prior to the scheduled meeting ending time.

12. A method according to claim 1, further comprising providing a computer network with a portal that allows a user to electronically request a meeting associated with the electronically inviting step,
wherein the user is a realtor requesting access to a locked residence or commercial building for sale to show the residence or building to a prospective buyer on a requested visit date and time, wherein the electronically generating step generates a time-limited unique visitor access passcode that is operational for a limited time duration in response to a request from the realtor using the portal, wherein the electronically accepting step is associated with a security entry access control device associated with the building or residence for sale to allow the realtor with the visitor access passcode access to the building or residence for sale for a limited time on the requested visit date, and wherein the method further comprises electronically transmitting the generated time-limited passcode to the realtor to provide the time-limited passcode for the electronically accepting step.

13. A method according to claim 1, wherein the generated time-limited access code is changed automatically during a time period, and wherein prospective meeting participants having longer authorized access times than other meeting participants are electronically notified of the changed time-limited passcode.

14. A system for administering limited-time visitor access passcodes, comprising:
a computer network with at least one computer having a visitor requestor portal for allowing a user to request visitor access to a restricted area, wherein the visitor requestor portal is configured to allow users to electronically request visitor access for at least one specified visitor to at least one specified location associated with a restricted area on a campus, building, floor, office or room, on a specified date and time in advance of a requested visit time;
a calendar-based access server in communication with the computer network, the calendar-based access server and/or the computer network configured to generate a time-limited visitor passcode to allow user access to the restricted area in response to a user placing a request for visitor access using the visitor requestor portal;
a security server in communication with the calendar-based access server and/or the computer network; and
at least one security passcode entry device in communication with the security server and/or the computer network that controls access to at least one restricted access area.

15. A system according to claim 14, further comprising at least one user-specific visitor communication device associated with a specified visitor in communication with the computer network and/or calendar based server, wherein the system is configured to transmit the time-limited visitor access passcode to the communication device of the specified visitor.

16. A system according to claim 14, wherein the calendar based access server is configured to generate visitor-specific individualized visitor access passcodes.

17. A system according to claim 14, wherein the system is configured to generate a meeting specific visitor access passcode for a group of different visitors associated with a scheduled meeting identified by the user placing the request for visitor access using the visitor requestor portal.

18. A system according to claim 14, wherein the visitor requestor portal is configured to allow a respective user to electronically schedule a meeting with a plurality of named meeting invitees on a specific date and projected start and end times in the restricted area, and wherein the system is configured to notify the security server of the access passcode for each meeting invitee or the group of invitees, and wherein the system is configured to automatically configure the at least one security control access device to accept the generated security passcode(s) for the restricted area on the date specified for a limited time associated with a scheduled meeting.

19. A system according to claim 14, wherein the system is configured to generate two different passcodes for the restricted area, which are used serially for access during different time intervals to the same restricted area, or which can be used to access specific different restricted portions of the at least one restricted area.

20. A computer program product for providing time-limited calendar-based access to restricted areas, comprising:

a non-transitory computer readable storage medium having computer readable program code embodied therein, the computer readable program code comprising:

computer readable program code configured to generate a time-limited access passcode that is operational for a security system for a limited time duration;

computer readable program code configured to allow a user to request visitor access to a meeting site in a restricted area at a planned meeting time and date for at least one specified meeting participant using a computer network;

computer readable program code configured to transmit the generated access passcode to the at least one meeting participant over the computer network;

computer readable program code configured to accept the access passcode in a security entry control device in communication with the security system to allow a user with the access passcode a time-limited entry to a restricted area; and computer readable program code configured to reject the access passcode to the restricted area using the security entry control device on a date after a certain time or expiration of a certain time period associated with the planned meeting time and date.

\* \* \* \* \*